Sept. 22, 1953     A. T. FLETCHER     2,652,659
GLASS CUTTER
Filed Oct. 27, 1950
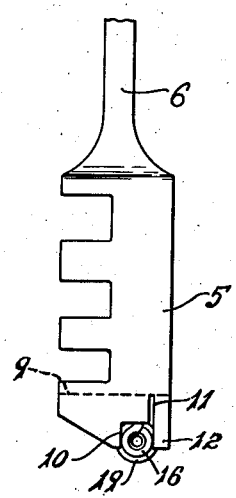
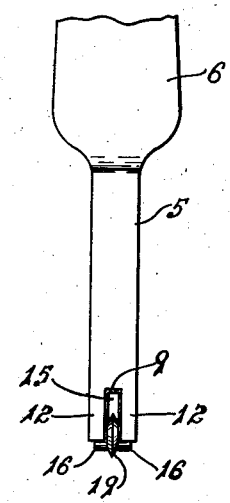
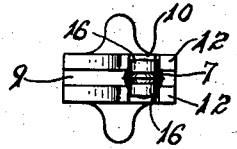
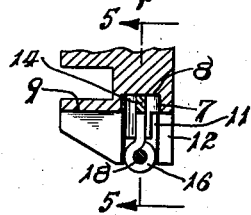
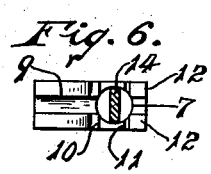
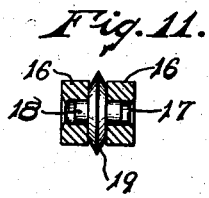
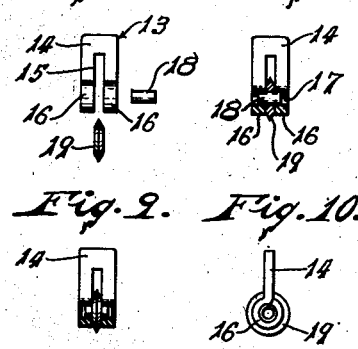
INVENTOR.
ARTHUR T. FLETCHER
BY
Louis V. Lucia
ATTORNEY.

Patented Sept. 22, 1953

2,652,659

UNITED STATES PATENT OFFICE 2,652,659

GLASS CUTTER

Arthur T. Fletcher, Bristol, Conn., assignor to The Fletcher-Terry Company, Forestville, Conn., a corporation of Connecticut Application October 27, 1950, Serial No. 192,438

2 Claims. (Cl. 49—52)

This invention relates to glass cutters and more particularly to improvements in cutter heads for hand glass cutters or for cutter units such as used on glass cutting machines.

It is an object of the present invention to provide novel improvements for such cutter heads which will materially improve the efficiency and strength of the cutter head and at the same time materially reduce the cost of manufacture of such cutters.

A further object of the invention is to provide a unitary cutter head which is highly durable and easy to manufacture.

A still further object of the invention is to provide a novel cutting wheel holder which is especially adapted for use in said head and which has certain novel improvements for reducing the cost of manufacture thereof and providing certain advantages over such cutter units as have been heretofore produced.

Further objects and advantages of this invention will be more clearly understood from the following description and the accompanying drawings in which:

Fig. 1 is a side view of the head portion of a hand operated glass cutter embodying my invention.

Fig. 2 is an edge view thereof.

Fig. 3 is a bottom view of the said cutter head.

Fig. 4 is a side view of the end portion of the said head in central vertical section with the glass cutting wheel removed.

Fig. 5 is a sectional edge view thereof on line 5—5 of Fig. 4 but showing the cutting wheel holder removed therefrom.

Fig. 6 is a bottom view with the cutting wheel holder shown in position therein and in horizontal section.

Fig. 7 is an exploded rear view of the cutting wheel holder, axle and cutting wheel.

Fig. 8 is a front view of said parts in assembled position and with the cutting wheel and hub portion of the holder shown in central vertical section.

Fig. 9 is a similar view but showing the material of the hub portion formed to retain the axle in position.

Fig. 10 is a side view of the cutter unit assembly.

Fig. 11 is an enlarged bottom view of the said unit with the hub portion of the holder shown in horizontal section.

As shown in the drawings, my improved glass cutter comprises a head portion 5 having a handle or shank 6 by means of which the said head portion may be held in the hand or mounted to a glass cutting machine or conventional form.

The head portion 5 is formed of a single piece of material and is provided with a hole 7 which extends upwardly from the lower end thereof into said head and has a bottom 8 to provide an abutment for the cutting wheel holder which will be hereinafter described.

The end of said head is grooved lengthwise to provide a cutting wheel groove 9, and crosswise to provide a holder receiving groove 10, the bottom of which is slit, as at 11, to form retaining fingers 12—12 at opposite sides of the slot 9 and which fingers are sufficiently resilient to retain the cutting wheel holder in said head.

The cutting wheel holder 13 is preferably constructed of sheet material and has a shank portion 14 which is provided with a slot 15 to receive the cutting wheel. The ends of the side portions of the said holder 13, at the opposite sides of the groove 15, are rolled around to provide co-axial loops 16—16 which form a bearing having an axial opening 17 therein that receives the axle 18 of the cutting wheel 19.

In order to retain the said axle 18 in position within the opening 17, the annular edges of the opposite ends of said opening are projected inwardly, as clearly shown at 17, in Fig. 11, to constrict the ends of said opening and thereby retain therein the axle 18. The said edges are projected by a spinning or swaging operation, or in any other suitable manner, and it will be noted that they are spaced from the ends of the axle 18 and thereby permit longitudinal movement of the said axle so that the wear thereon by the rotation of the wheel will be distributed over a greater portion of its length instead of being concentrated at one point.

The improved construction of the cutting wheel holder above described is of particular advantage since, by constricting the ends of the opening 17 to retain the axle 18 therein, it eliminates the necessity of heading the opposite ends of the axle or otherwise shaping it to retain it in the hub of the holder, and thereby permits the use of a hardened axle.

In the use of my invention, the holder 13 will fit into the hole 7 and the end of the shank 14 of said holder will abut the bottom 8 of the hole so as to support the cutting wheel in its proper position. The opposed loops 16—16 of the hub portion will fit in the slot 10 and be engaged therein by the resilient fingers 12—12 to thereby frictionally retain the cutting unit in the cutter head.

The above described construction of the cutter head and the cutting wheel holder materially reduces the cost of manufacturing applicant's glass cutter since its novel construction permits the production of the head by simple drilling and slotting operations and, by supporting the holder upon the bottom of the hole 17 and by the parallel sides of said hole, no supporting shoulders or means are required on the holder and it may, therefore, have straight parallel sides and be economically produced from a strip of sheet metal. Supporting the holder upon the bottom of the hole and against the straight sides thereof further provides a firm support for the cutting wheel unit in the cutter head.

I claim:

1. A glass cutter including a head portion having a bottomed recess with straight parallel sides, a groove extending across the entrance to said recess and a separate groove extending crosswise to the first groove, a slit in the bottom of the separate groove providing resilient extensions in said head at one side of the separate groove, a holder supported upon the bottom of said recess and having straight parallel sides abutting the sides of the recess, the said holder being constructed from a strip of sheet metal having spaced extensions formed into spaced loops to provide bearing portions in said holder having an opening extending therethrough, an axle rotatably and slidably contained within said opening, a cutting wheel rotatable on said shaft between the bearing portion of the holder, the said axle being shorter than the length of the opening and the edges of the opposite ends of said opening being constricted to retain the axle within the opening and permit longitudinal movement thereof between the said ends to prevent concentration of wear on the axle by the rotation of the wheel thereon, the said unit being connected to the cutter head by fitting within the recess and against the bottom thereof, and the said looped portions fitting within the separate groove and being resiliently engaged by the resilient fingers for frictionally retaining the unit in operative position within the cutter head.

2. For a glass cutting device, a cutting wheel unit including a holder constructed of an elongated blank of flat sheet metal having straight parallel sides and spaced projections extending from one end thereof, the said projections being rolled into closed loops and thereby forming bearings with an opening extending therethrough, a cutting wheel positioned between said bearings, and an axle rotatable and slidable in said opening and extending through said wheel and rotatably mounting said wheel to the holder; the edges of the opposite ends of said opening being constricted to retain the axle within said opening.

ARTHUR T. FLETCHER.

References Cited in the file of this patent

UNITED STATES PATENTS

| Number | Name | Date |
| --- | --- | --- |
| 742,179 | Fletcher | Oct. 27, 1903 |
| 1,221,076 | Monce | Apr. 3, 1917 |
| 1,634,323 | Fletcher | July 5, 1927 |
| 1,870,585 | Parks et al. | Aug. 9, 1932 |
| 1,884,635 | Fancher | Oct. 25, 1932 |
| 2,096,284 | Lee | Oct. 19, 1937 |
| 2,254,162 | Wyman | Aug. 26, 1941 |
| 2,341,030 | Fletcher | Feb. 8, 1944 |
| 2,566,544 | Wyman | Sept. 4, 1951 |